Patented Oct. 22, 1929

1,732,944

UNITED STATES PATENT OFFICE

THOMAS W. MILLER, OF ASHLAND, OHIO, ASSIGNOR TO THE FAULTLESS RUBBER COMPANY, OF ASHLAND, OHIO, A CORPORATION OF OHIO

PRODUCTION OF VULCANIZED RUBBER

No Drawing.    Application filed September 22, 1927.   Serial No. 221,387.

My invention relates to the production of vulcanized rubber, and the principal object of my invention is to provide a superior vulcanized article of high tensile strength and possessing good aging properties. The vulcanizing process by which these articles are produced is characterized by extreme simplicity, vulcanization can be accomplished in a comparatively short time at or below a temperature of 212 degrees Fahrenheit, the compound possesses immunity from pre-vulcanization, and free sulphur is practically eliminated from the vulcanized product.

In carrying out my invention I employ two accelerators, designated by me as "accelerator A" and "accelerator B", either accelerator will speed up the vulcanization of a stock containing an "activating agent", such as zinc oxide, "accelerator A" at a low temperature, and "accelerator B" at temperatures around 250 degrees Fahrenheit, and the combined action of the two will produce a quicker vulcanization at lower temperature than either will accomplish used in quantities suitable for the purposes of my invention.

In carrying out my invention I first prepare a rubber compound which may consist of rubber, the "activating agent", sulphur, "accelerator B", and the desired fillers, softeners, and pigments. This compound may be milled and calendered in the usual manner, if to be used for dipped goods may be converted into rubber cement by the addition of naptha or other solvents, and may be formed and shaped as desired, all without danger of pre-vulcanization. The compound, or articles made therefrom, can then be vulcanized by immersion for a comparatively short time in a hot water bath containing a suitable quantity of "accelerator A".

In actual practice I find it satisfactory to employ zinc oxide itself as the "activating agent," to employ ethylidine aniline or hexamethylenetetramine as the "accelerator B," and to employ as "accelerator A" any suitable water soluble ultra accelerator, such as tetra-methyl-thiuram-monosulphide, or as the unoxidized water soluble reaction product of carbon bisulphide and dimethylamine. According to one specific example which I have found operative I prepare a rubber compound consisting of rubber ninety-five and one-half parts, zinc oxide two parts, sulphur two parts, either "accelerator B" hereinbefore named one-half part, and fillers and softeners and pigments as desired, I then work and form this compound as desired, and I then secure vulcanization by immersion for from twenty to sixty minutes in a water bath maintained at about two hundred degrees Fahrenheit and containing the unoxidized water soluble reaction product of carbon bisulphide and dimethylamine maintained in the proportion of one-fourth part of the reaction product to one hundred parts of water. The variation in the length of time required to complete the vulcanization depends both on the degrees of vulcanization desired and on the thickness of the article being vulcanized.

Inasmuch as many "activating agents" and particularly zinc oxide itself, when employed in limited quantities and subjected to the action of the amine and carbon bisulphide, will dissolve, it will be understood that my invention may be utilized to produce articles of natural rubber color and transparency. It will also be understood that with suitable compounding my invention may be employed with equal facility for the production of articles formed in one or more colors. And it will be understood that in any event my invention provides an article analyzing ninety-five per cent or more pure rubber.

At the same time it will be understood by those skilled in the art that the particular embodiment of my invention herein described may be variously changed and modified without departing from the spirit of my invention or sacrificing the advantages thereof, and it therefore will be understood that the disclosure herein is illustrative only and that my invention is not limited thereto.

I claim:

1. The method of producing vulcanized rubber which comprises: preparing a stock containing rubber, an "activating agent", sulphur as required, "accelerator B", and fillers and pigments as desired; forming as desired;

and then vulcanizing in heated water containing "accelerator A".

2. The method of producing vulcanized rubber which comprises: preparing a stock containing rubber, an "activating agent", sulphur as required, "accelerator B", and fillers and pigments as desired; forming as desired; and then vulcanizing, in heated water containing "accelerator A", at a temperature below 212 degrees Fahrenheit.

3. The method of producing vulcanized rubber which comprises: preparing a stock containing rubber, an "activating agent", sulphur as required, "accelerator B", and fillers and pigments as desired; forming as desired; and then vulcanizing in heated water containing a water soluble reaction product of carbon bisulphide and an amine.

4. The method of producing vulcanized rubber which comprises: preparing a stock containing rubber, an "activating agent", sulphur as required, "accelerator B", and fillers and pigments as desired; forming as desired; and then vulcanizing in heated liquid containing accelerator "A".

5. The method of producing vulcanized rubber which comprises: preparing a stock containing rubber, an "activating agent", sulphur as required, "accelerator B", and fillers and pigments as desired; forming as desired; and then vulcanizing, in heated water containing a water soluble reaction product of carbon bisulphide and an amine, at a temperature below 212 degrees Fahrenheit.

6. The method of producing vulcanized rubber which comprises: preparing a stock containing rubber, an "activating agent", sulphur as required, "accelerator B," and fillers and pigments as desired; forming as desired; and then vulcanizing, in heated liquid containing a reaction product, soluble in said liquid, of carbon bisulphide and an amine.

7. The method of producing vulcanized rubber which comprises: preparing a stock containing rubber, zinc oxide, sulphur as required, "accelerator B", and fillers and pigments as desired; forming as desired; and then vulcanizing in heated liquid containing "accelerator A".

8. The method of producing vulcanized rubber which comprises: preparing a stock containing rubber and less than the total agents of vulcanization; forming as desired; and then vulcanizing in heated liquid containing agents of vulcanization complementary to the agents of vulcanization, contained in said stock.

9. The method of producing vulcanized rubber which comprises: preparing a stock containing rubber and less than sufficient agents of vulcanization to produce mill-scorching; forming as desired; and then vulcanizing in heated liquid containing agents of vulcanization complementary to the agents of vulcanization contained in said stock.

10. The method of producing vulcanized rubber which comprises: preparing a stock containing rubber and less than the total agents of vulcanization; forming as desired; and then vulcanizing in heated water containing agents of vulcanization complementary to the agents of vulcanization contained in said stock.

11. The method of producing vulcanized rubber which comprises: preparing a stock containing rubber and less than sufficient agents of vulcanization to produce mill-scorching; forming as desired; and then vulcanizing in heated water containing agents of vulcanization complementary to the agents of vulcanization contained in said stock.

12. The method of producing vulcanized rubber which comprises: preparing a stock containing rubber and less than the total agents of vulcanization; forming as desired; and then vulcanizing, in heated liquid containing agents of vulcanization complimentary to the agents of vulcanization, contained in said stock, at a temperature below the normal boiling temperatures of said liquid.

13. The method of producing vulcanized rubber which comprises: preparing a stock containing rubber and less than sufficient agents of vulcanization to produce mill-scorching; forming as desired; and then vulcanizing, in heated liquid containing agents of vulcanization complementary to the agents of vulcanization contained in said stock, at a temperature below the normal boiling temperature of said liquid.

14. The method of producing vulcanized rubber which comprises: preparing a stock containing rubber, an "activating agent", sulphur as required, accelerator "B", and fillers and pigments as desired; forming as desired; and then vulcanizing, in heated liquid containing accelerator "A", at a temperature below the normal boiling temperature of said liquid.

15. The method of producing vulcanized rubber which comprises: preparing a stock containing rubber, an "activating agent", sulphur as required, accelerator "B", and fillers and pigments as desired; forming as desired; and then vulcanizing, in heated liquid containing a reaction product soluble in said liquid of carbon bisulphide and an amine, at a temperature below the normal boiling temperature of said liquid.

16. The method of producing vulcanized rubber which comprises: preparing a stock containing rubber and less than the total agents of vulcanization; forming as desired; and then vulcanizing, in heated water containing agents of vulcanization complementary to the agents of vulcanization contained in said stock, at a temperature below the normal boiling temperature of said liquid.

17. The method of producing vulcanized rubber which comprises: preparing a stock containing rubber and less than sufficient agents of vulcanization to produce mill-scorching; forming as desired; and then vulcanizing, in heated liquid containing agents of vulcanization complementary to the agents of vulcanization contained in said stock, at a temperature below the normal boiling temperature of said liquid.

In testimony whereof I hereunto affix my signature.

THOMAS W. MILLER.